(12) United States Patent
Hanaduka et al.

(10) Patent No.: US 6,217,094 B1
(45) Date of Patent: Apr. 17, 2001

(54) OBJECT HOLDING DEVICE

(75) Inventors: Akira Hanaduka; Toshihiro Okabe; Takashi Takatsuki, all of Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 09/575,893

(22) Filed: May 22, 2000

(30) Foreign Application Priority Data

May 24, 1999 (JP) .................................................. 11-143621

(51) Int. Cl.[7] .................................................. B25J 15/08
(52) U.S. Cl. .......................... 294/106; 294/907; 901/36; 901/46
(58) Field of Search .................................. 294/106, 99.1, 294/907; 901/32, 33, 36, 38, 39, 46; 623/63, 64; 269/225; 414/4

(56) References Cited

U.S. PATENT DOCUMENTS

| | | | |
|---|---|---|---|
| 3,866,966 | * | 2/1975 | Skinner, II .......................... 294/106 |
| 4,114,464 | * | 9/1978 | Schubert et al. ........................ 623/64 |
| 4,149,278 | * | 4/1979 | Wiker et al. ............................ 901/38 |
| 4,286,380 | * | 9/1981 | Blount .................................... 294/106 |
| 4,598,942 | * | 7/1986 | Shum et al. .......................... 294/106 |

FOREIGN PATENT DOCUMENTS 11320473    11/1999   (JP) .

* cited by examiner

*Primary Examiner*—Dean J. Kramer
(74) *Attorney, Agent, or Firm*—Nilles & Nilles SC

(57) ABSTRACT

An object holding device has a base plate, first and second claws, base ends of which are pivoted at the first and second pivotal points on the base plate, respectively, free ends of which hold an object detachably, a driving device, first and second driven members to be rotated around the first and second pivotal points, respectively, by a driving device, and first and second spiral springs wound around the first and second pivotal points, respectively, for connecting the first and second driven members with the first and second claws, respectively, in order to urge the claws in a closed position. An angular position of the claw is detected, and an original position is set when the claws are opened fully. The object is held by a holding force according to the difference between the rotary angles of the driven member and the claw.

5 Claims, 6 Drawing Sheets

OBJECT HOLDING DEVICE

BACKGROUND OF THE INVENTION

1. Field of the Invention

This invention relates to an object holding device and, more particularly, relates to a premium holding device for use in a game machine.

2. Description of the Prior Art

FIG. 7 to FIG. 10 show a conventional object holding device. A reference numeral 1 denotes a base plate, 2 denotes a driving device, 6 denotes a tension spring, 10-1 and 10-2 denote first and second claws, 11 denotes a rotary plate driven by the driving device 2 for opening the first and second claws 10-1 and 10-2, and 12 denotes first and second pivotal shafts provided on the base plate 1 for supporting rotatably base ends of the first and second claws 10-1 and 10-2, respectively.

FIG. 7 shows the conventional holding device in a state that the claws 10-1 and 10-2 are closed. FIG. 9 shows the conventional holding device in a state that the claws 10-1 and 10-2 are opened. The tension spring 6 is inserted between the first and second claws 10-1 and 10-2 for attracting the claws so as to close them.

The rotary plate 11 is in a shape of an oval having a long axis and a short axis and arranged in the vicinity of the pivotal shafts 12 and between the first and second claws 10-1 and 10-2. When the rotary plate 11 is rotated by the driving device 2 and the short axis sides of the rotary plate 12 are brought into contact with the claws 10-1 and 10-2, the claws 10-1 and 10-2 are closed by the action of the tension spring 6 as shown in FIG. 7 and FIG. 8. When the rotary plate 11 is rotated and the long axis sides of the rotary plate 12 are brought into contact with the claws 10-1 and 10-2, the claws 10-1 and 10-2 are opened against the action of the tension spring 6 as shown in FIG. 9 and FIG. 10.

The object holding device is normally used for holding many kinds of premiums. If the premium is fragile, the holding force of the object holding device has to be reduced. On the contrary, if the premium has a large mass, the holding force has to be increased. In order to attain such requirements, it is necessary to replace the tension spring 6 according to the kind of the premium.

SUMMARY OF THE INVENTION

An object of the present invention is to provide an object holding device, which can solve the above problems.

A further object of the present invention is to provide an object holding device comprising a base plate, first and second pivotal points formed on the base plate, first and second claws, base ends of which are pivoted at the first and second pivotal points on the base plate, respectively, free ends of which hold an object detachably, a driving device, first and second driven members mounted rotatably around the first and second pivotal points, respectively, and rotated by the driving device, and first and second spiral springs wound around the first and second pivotal points, respectively, for connecting the first and second driven members with the first and second claws, respectively, in order to urge the claws in a closed position.

Yet further object of the present invention is to provide an object holding device comprising a device for detecting an angular position of the claw, and a device for setting an original position when the claws are opened fully.

These and other objects and advantages of the present invention will become apparent from the following description of the preferred embodiments taken in conjunction with the accompanying drawings.

DESCRIPTION OF THE PREFERRED EMBODIMENTS

Figure 1:
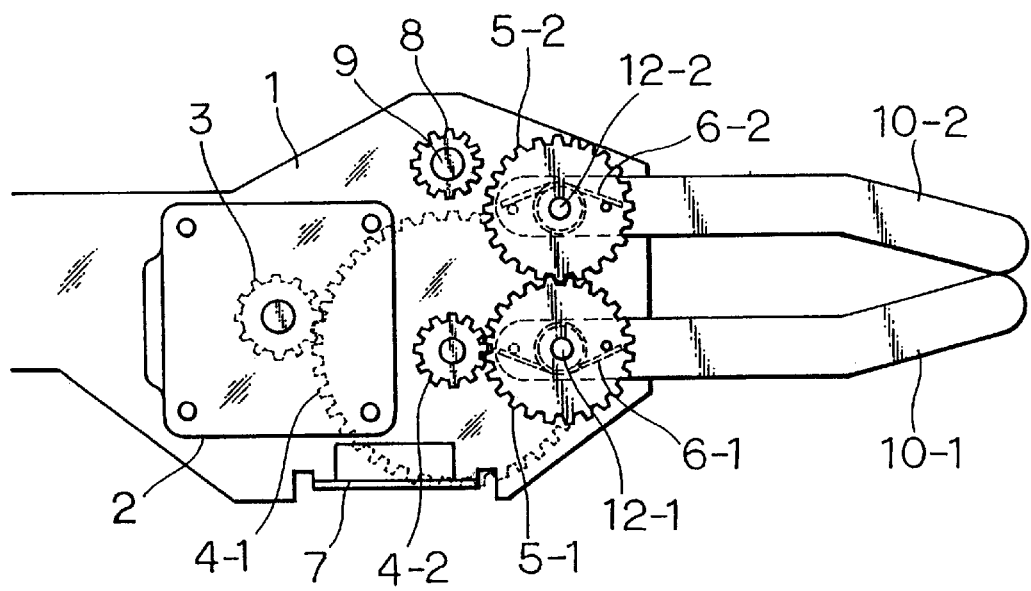
FIG. 1 is a plan view of an object holding device according to the present invention of a closed state.

FIG. 1 shows an object holding device according to the present invention in a state that first and second object holding claws 10-1 and 10-2 are closed.

Figure 2:
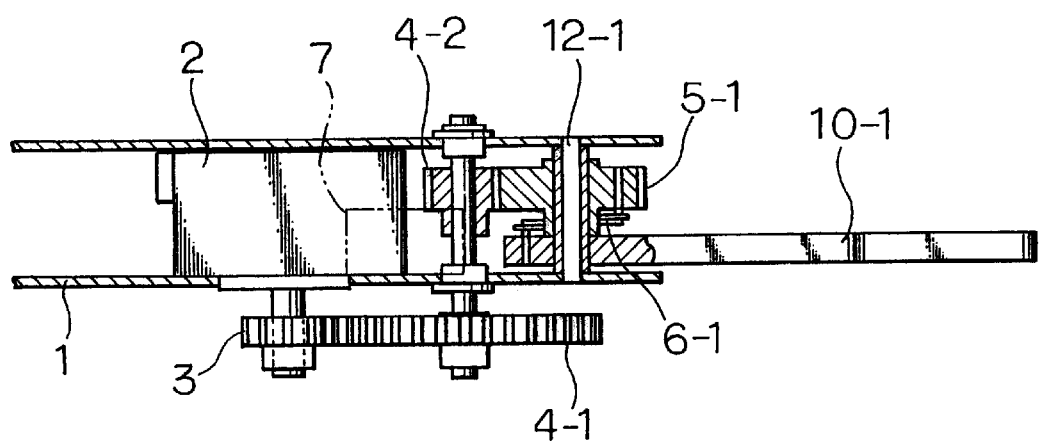
FIG. 2 is a vertically sectioned side view of the object holding device shown in FIG. 1.

FIG. 2 shows a vertically sectioned side view of the object holding device shown in FIG. 1.

As shown in FIG. 1 and FIG. 2, a drive gear 3 is mounted on an output shaft of a driving device 2 such as a stepping motor. The drive gear 3 is engaged through intermediate gears 4-1 and 4-2 with a first driven gear 5-1 supported rotatably by a base plate 1 through a first pivotal shaft 12-1. The first pivotal shaft 12-1 also supports rotatably a base end of the first claw 10-1. A first spiral spring 6-1 is wound around the first pivotal shaft 12-1, one end of which is connected to the first driven gear 5-1, and the other end of which is connected to the first claw 10-1.

The first driven gear 5-1 meshes with a second driven gear 5-2 supported rotatably by the base plate 1 through a second pivotal shaft 12-2. The second pivotal shaft 12-2 also supports rotatably a base end of the second claw 10-2. A second spiral spring 6-2 is wound around the second pivotal shaft 12-2, one end of which is connected to the second driven gear 5-2, and the other end of which is connected to the second claw 10-2.

Accordingly, when the driving device 2 is actuated, the first and second driven gears 5-1 and 5-2 are rotated in the opposite directions to each other, so that the first and second claws 10-1 and 10-2 are urged to open or close through the first and second spiral springs 6-1 and 6-2.

Figure 3:
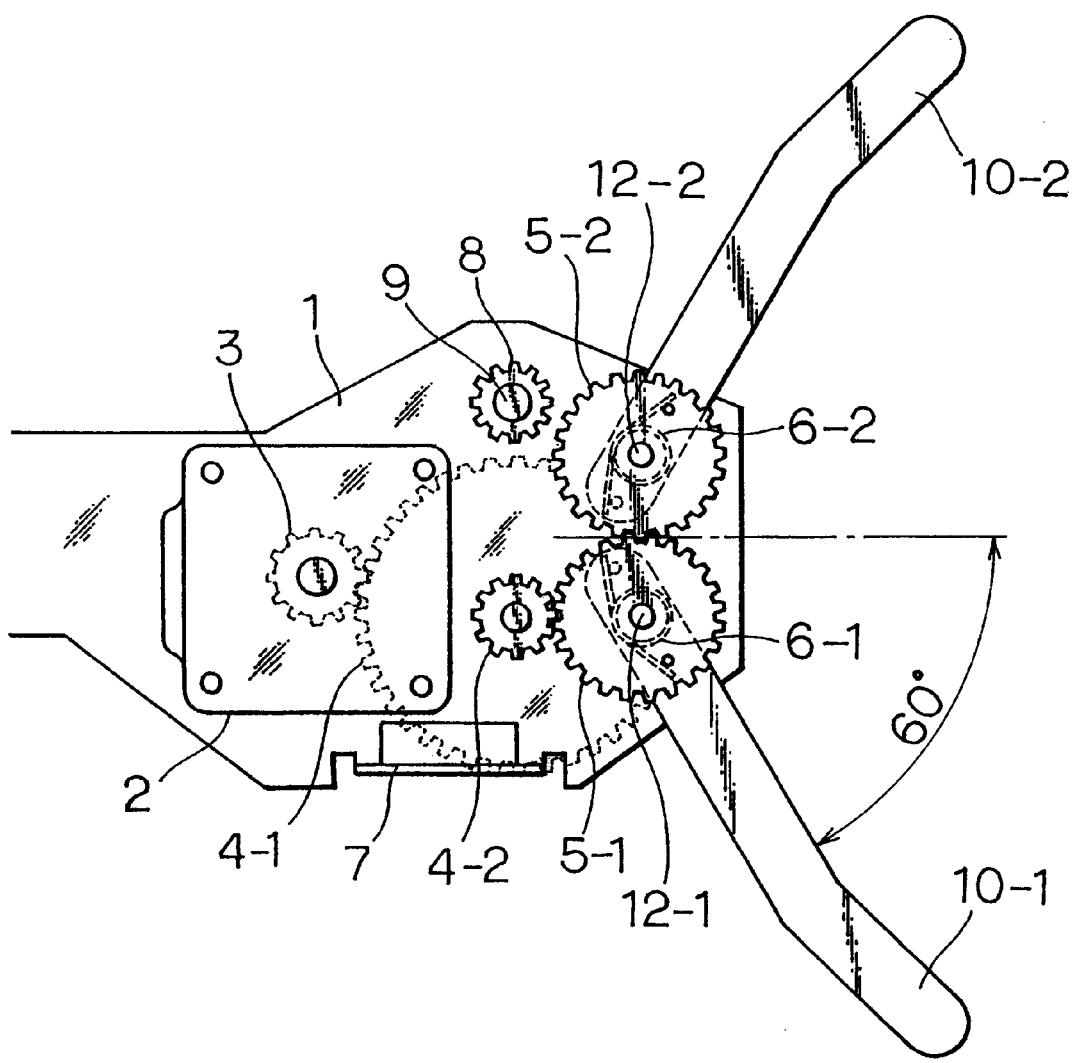
FIG. 3 is a plan view of the object holding device according to the present invention of an open state.

An original position setting device 7 is provided in order to generate ON-OFF signal of the driving device 2 when the first and second claws 10-1 and 10-2 are opened fully, as shown in FIG. 3.

Figure 4:
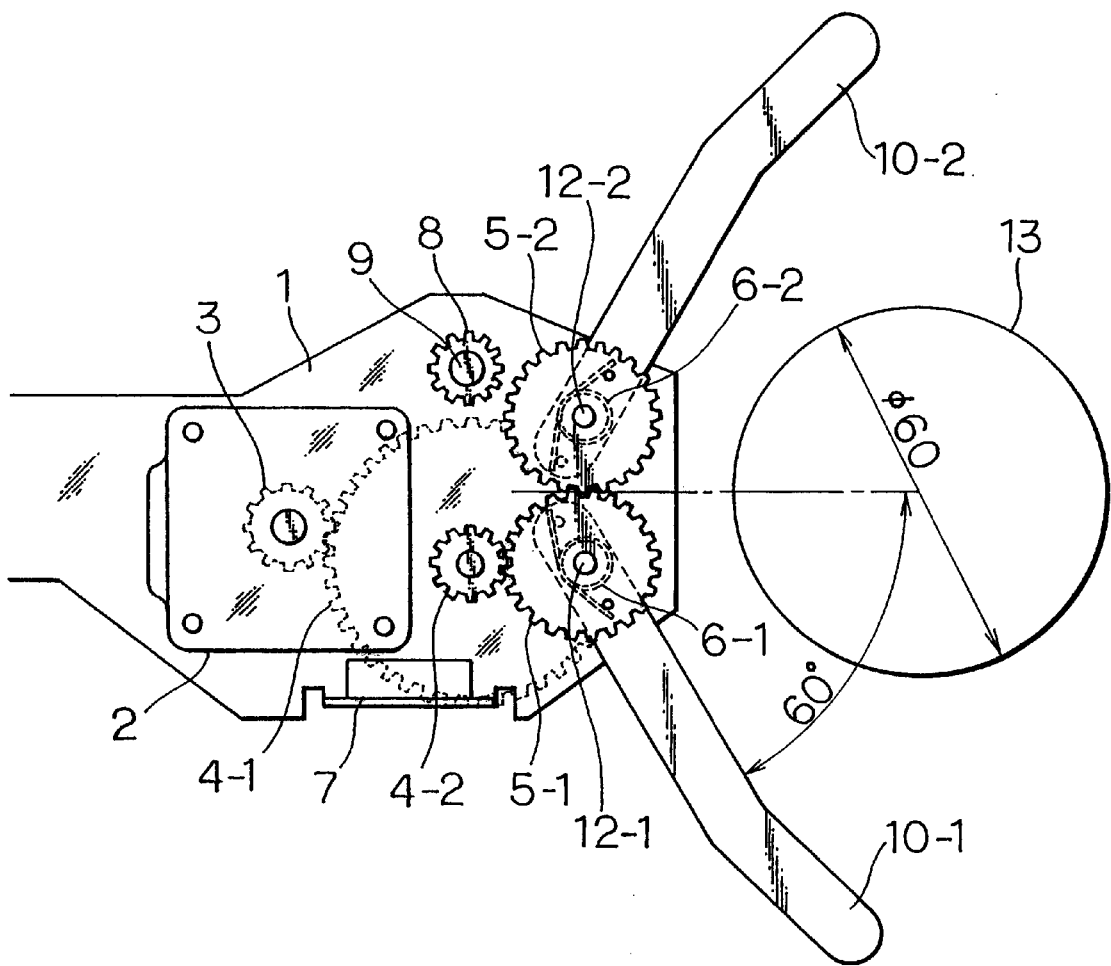
FIG. 4 shows a view explaining the relation between the object holding device of the open state and a premium.

FIG. 4 shows the object holding device of the open state with a premium 13 of 60 mm in diameter.

Figure 5:
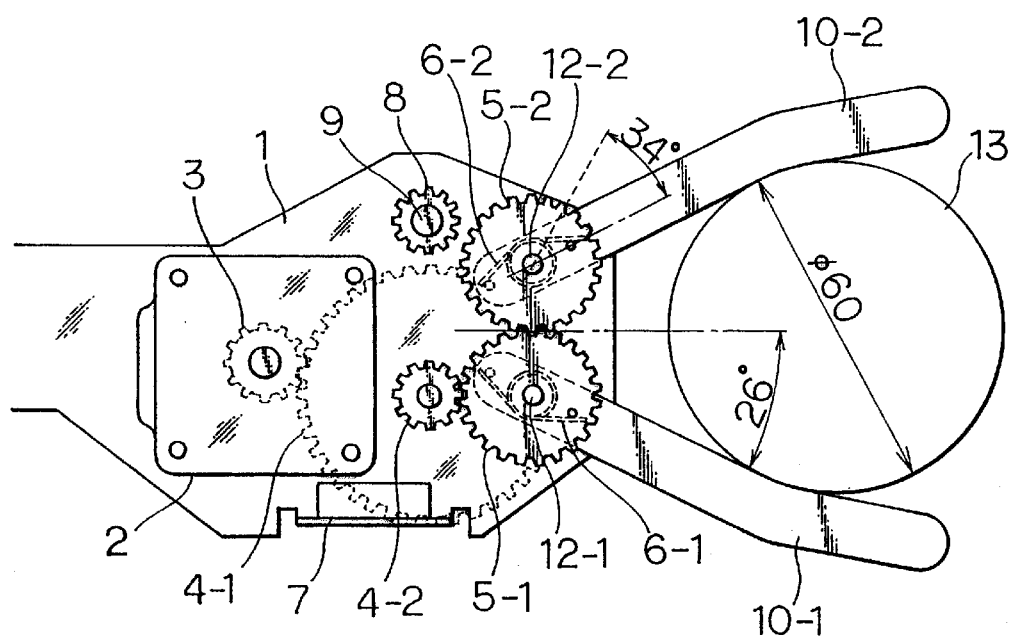
FIG. 5 is a plan view of the object holding device according to the present invention in a state that the premium is caught by claws of the object holding device.

FIG. 5 shows a state that the premium 13 is caught by the claws 10-1 and 10-2, wherein the driven gears 5-1 and 5-2 are rotated by 34°, respectively, and no pressure due to the spiral springs 6-1 and 6-2 is applied on the premium 13.

During the movement of the claws 10-1 and 10-2 from the position shown in FIG. 4 to the position shown in FIG. 5, the rotation of the driving device 2 is transmitted to the claws 10-1 and 10-2 through the first and second driven gears 5-1 and 5-2, and the first and second spiral springs 6-1 and 6-2.

In this case, the spiral springs 6-1 and 6-2 are not wound up.

Figure 6:
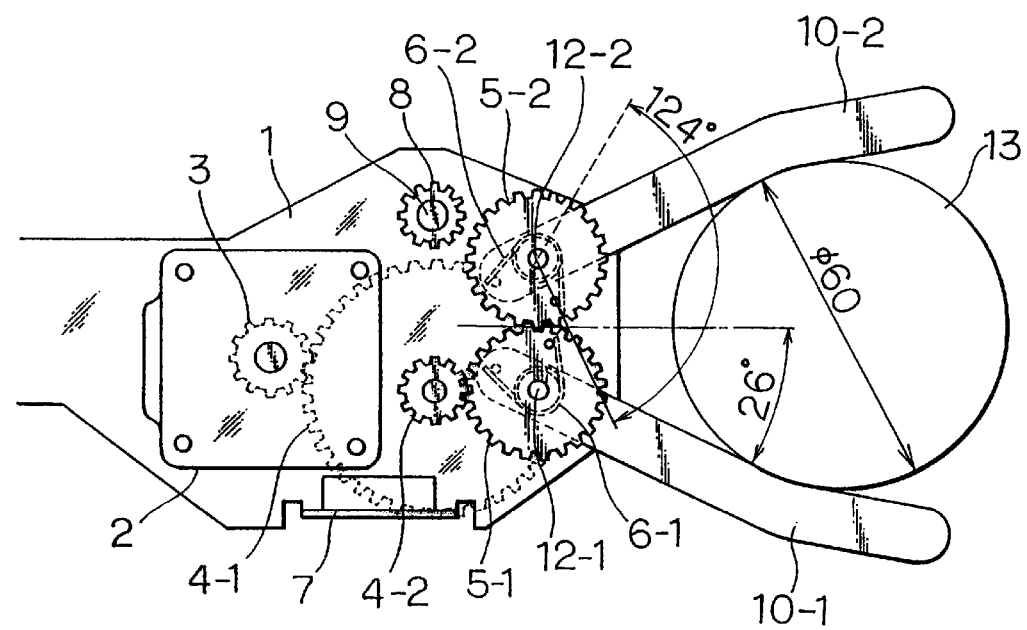
FIG. 6 is a plan view of the object holding device according to the present invention in a state that the premium is held with pressure by the claws of the object holding device.
Figure 7:
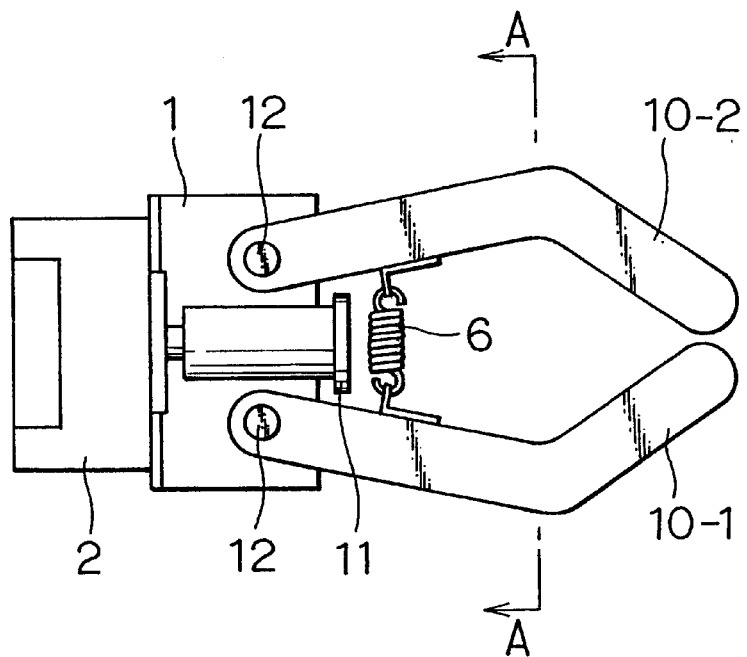
FIG. 7 is a plan view of a conventional object holding device of a closed state.
Figure 8:
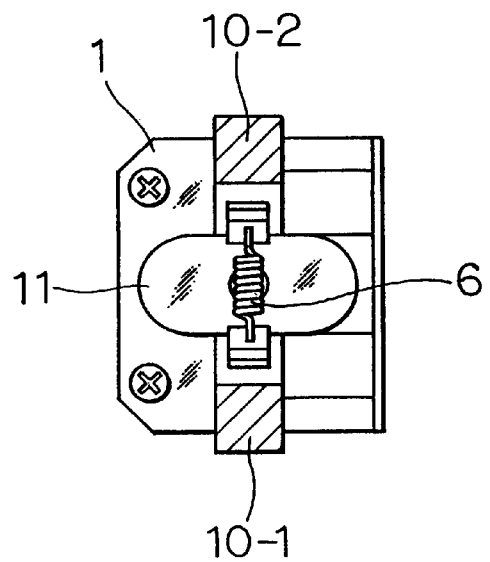
FIG. 8 is a vertically sectioned side view of the object holding device shown in FIG. 7.
Figure 9:
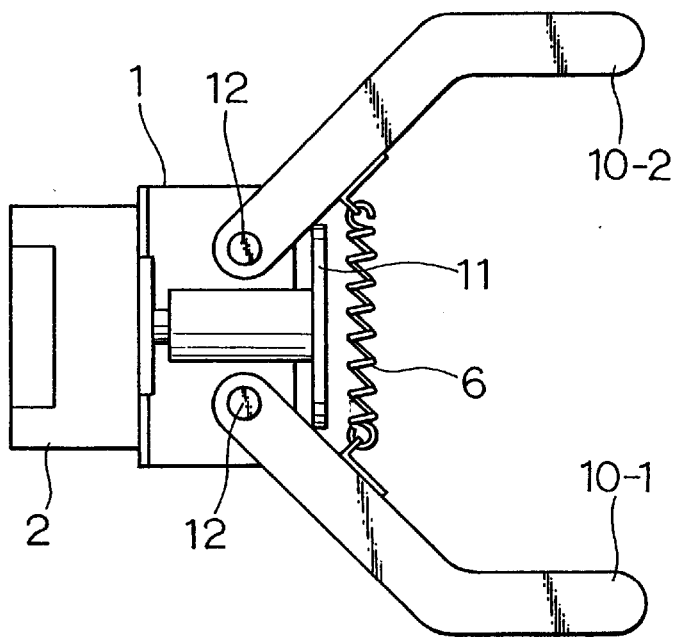
FIG. 9 is a plan view of the conventional object holding device of an open state.
Figure 10:
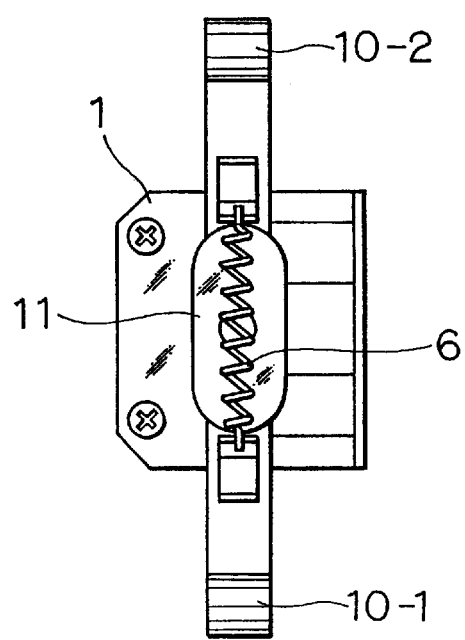
FIG. 10 is a vertically sectioned side view of the object holding device shown in FIG. 9.

FIG. 6 shows a state that the driven gears 5-1 and 5-2 are rotated by 124°, respectively, so that the spiral springs 6-1 and 6-2 are wound up and a pressure due to the springs is applied on the premium 13. The value of the spring pressure is in proportion to the difference between the rotary angle of the driven gears 5-1 and 5-2 and the rotary angle of the claws 10-1 and 10-2, so that it can be found by detecting the difference in rotary angle.

If the difference in rotary angle is set according to the nature, material, softness or figure etc. of the premium 13, the premium 13 can be held suitably and stably.

The premium 13 shown in FIG. 5 and FIG. 6, is not deformed, however, if the premium 13 is soft in material, the premium 13 may be deformed by the pressure of the claws 10-1 and 10-2, and the stop positions of the claws 10-1 and 10-2 are varied. The angular position of one of the claws 10-1 and 10-2 is detected by an angular position detecting device 9 such as a potentiometer or an encoder mounted on the base plate 1 and operated by a detection gear 8. The detection gear 8 is meshed with a gear (not shown) rotated by the claw. The detection gear 8 can be arranged on one of the pivotal shafts 12-1 and 12-2 and connected directly to one of the claws 10-1 and 10-2 so as to be rotated by the rotation of the claw.

Any control system of the driving device 2 using an output signal from the angular position detecting device 9 is publicly known and accordingly the detailed explanation thereof is omitted.

Further, it is possible to control the angular positions of the claws independently with each other by providing the angular position detecting device 9 for each claw in case that the figure of the premium 13 is asymmetrical with respect to the claws 10-1 and 10-2.

As stated above, according to the present invention, the object can be held suitably and stably irrespective of the nature, material, softness or figure etc. of the object.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. An object holding device comprising a base plate, first and second pivotal points formed on the base plate, first and second claws, base ends of which are pivoted at the first and second pivotal points on the base plate, respectively, free ends of which hold an object detachably, a driving device, first and second driven members mounted rotatably around the first and second pivotal points, respectively, and rotated by the driving device, and first and second spiral springs wound around the first and second pivotal points, respectively, for connecting the first and second driven members with the first and second claws, respectively, in order to urge the claws in a closed position.

2. The object holding device according to claim 1, further comprising a device for detecting an angular position of the claw, and a device for setting an original position when the claws are opened fully.

3. The object holding device according to claim 2, wherein the device for detecting the angular position of the claws is a potentiometer.

4. The object holding device according to claim 2, wherein the device for detecting the angular position of the claws is a rotary encoder.

5. The object holding device according to claim 2, further comprising a device for setting a rotary amount of the driven member, wherein the object is held by a holding force according to the difference between the rotary angles of the driven member and the claw.

* * * * *